United States Patent [19]

Lipatova et al.

[11] 3,959,210

[45] May 25, 1976

[54] ACRYLATE ADHESIVE COMPOSITION

[76] Inventors: Tatyana Esperovna Lipatova, ulitsa Vladimirskaya, 51/53, kv. 22; Roman Alexandrovich Veselovsky, Kharkovskoe shosse, 21/3, kv. 179; Ljudmila Ivanovna Chirkova, ulitsa Krasnotkatskaya, 20, kv. 9; Boris Artemievich Lyashenko, ulitsa Vystavochnaya, 2, kv. 82, all of Kiev, U.S.S.R.

[22] Filed: Feb. 20, 1974

[21] Appl. No.: 444,115

[52] U.S. Cl. ............................ 260/42.13; 260/40 R; 260/42.18; 260/42.52; 260/77.5 CR; 260/861; 260/869; 260/870; 260/885
[51] Int. Cl.² ..................... C08K 3/00; C08L 33/08; C08L 79/03; C09J 3/14
[58] Field of Search ............... 260/31.2 R, 31.2 XA, 260/33.60 A, 861, 870, 875, 33.4 CR, 876 R, 881, 885, 42.13, 42.18, 42.52

[56] References Cited
UNITED STATES PATENTS

| | | | |
|---|---|---|---|
| 3,063,958 | 11/1962 | Perkins et al. | 260/31.2 XA |
| 3,425,988 | 2/1969 | Gorman et al. | 260/31.2 XA |
| 3,541,274 | 11/1970 | D'Cruz | 260/31.2 XA |
| 3,651,173 | 3/1972 | Doi et al. | 260/31.2 XA |
| 3,689,310 | 9/1972 | Johnson et al. | 260/885 |

*Primary Examiner*—Allan Lieberman
*Attorney, Agent, or Firm*—Fleit & Jacobson

[57] ABSTRACT

An adhesive composition containing unsaturated polyesters or acrylates dissolved in organic solvents which include unsaturated carbon-to-carbon bonds; polymerizing agents, i.e., polymerization initiators or catalysts; a product of interaction of allyl alcohol with a diisocyanate derivative and benzoyl chloride; and a fluorinated alcohol of the general formula $C_nF_{2n+1}OH$, wherein $n = 5$ to 15.

10 Claims, No Drawings

ACRYLATE ADHESIVE COMPOSITION

The present invention relates to polymers, and more particularly to adhesive compositions.

The adhesive compositions of the invention can be advantageously used for bonding metals, ceramics, glass, stone, polymers and other materials.

Known in the art is an adhesive composition based on methyl methacrylate with the addition of a polyvinylacetate resin, a composition based on an alkyl methacrylate copolymer with methacrylic acid introduced whereinto is polyurethane rubber, as well as compositions containing organic diisocyanates, glicerine dimethacrylate, ethylene-glycol monomethacrylate, and methacrolein.

The above compositions are used as structural adhesives, for adhesion-welding bonding, bonding of decorative and facing materials, and as sealing compounds.

These compositions, however, are ineffective for the bonding of wet surfaces as well as those submerged in water. Nor can they bond surfaces coated with or immersed in liquid hydrocarbons. Bonds formed by the prior art adhesive compositions are not sufficiently strong and waterproof.

An adhesive composition is also known which contains a polymerizable unsaturated compound in the form of a solution of polybutyl methacrylate in butyl methacrylate, as well as a polymerizing agent, dimethyl aniline, which is a polymerization initiator.

This composition is used as an adhesive for adhesion-welding bonding, but the adhesion strength ensured thereby does not exceed 70 kg/cm$^2$ and it cannot bond surfaces wetted with water or liquid hydrocarbons.

The introduction of various additives into the prior art adhesive compositions eliminates some of the disadvantages inherent therein, such as low heat and freeze resistance, diminishes the rigidity of the adhesive layer, and increases the rate of setting of the adhesive.

It is an object of the present invention to provide a cold-setting, waterproof, oilproof and vibration-resistant adhesive composition capable of strongly bonding metals, ceramics, glass, stone and plastics.

Another object of the invention is to provide an adhesive composition capable of strongly bonding the above-mentioned materials in water.

Still another object of the invention is to provide an adhesive composition capable of strongly bonding the above materials in a liquid hydrocarbon medium, as well as bonding these materials, coated with liquid hydrocarbons, in water.

With these and other objects in view, the present invention provides an adhesive composition which contain unsaturated polyesters or acrylates dissolved in organic solvents including unsaturated carbon-to-carbon bonds, polymerizing agents, i.e. polymerization initiators or catalysts, a product of interaction of allyl alcohol with diisocyanate and benzoyl chloride, and a fluorinated alcohol of the general formula $C_nF_{2n+1}OH$, wherein $n = 5$ to $15$.

The proposed adhesive composition should preferably have the following content of constituents, in parts by weight:

| | |
|---|---|
| 30–50% solution of an acrylate in an organic solvent including unsaturated carbon-to-carbon bonds | 100–110; |
| product of interaction of allyl alcohol with a derivative of diisocyanate and benzoyl chloride | 10–60; |
| fluorinated alcohol | 0.1–10; |
| polymerizing agents | 0.1–3. |

It is also preferable that the composition have the following content of constituents, in parts by weight:

| | |
|---|---|
| 50–60% solution of an unsaturated polyester in an organic solvent including unsaturated carbon-to-carbon bonds | 100; |
| product of interaction of allyl alcohol with a derivative of diisocyanate and benzoyl chloride | 10–60; |
| fluorinated alcohol | 0.1–10; |
| polymerizing agents | 0.1–12. |

For bonding metals in air and in water, an adhesive composition should be used preferably having the following content of constituents, in parts by weight:

| | |
|---|---|
| 40% solution of polybutyl methacrylate in methyl methacrylate | 100; |
| product of interaction of allyl alcohol with toluene diisocyanate and benzoyl chloride | 10; |
| perfluoropentyl alcohol | 1; |
| benzoyl peroxide | 1; |
| dimethyl aniline | 1. |

It is expedient that an adhesive composition for obtaining vibration-resistant adhesion bonds have the following content of constituents, in parts by weight;

| | |
|---|---|
| 40% solution of polybutyl methacrylate in methyl methacrylate | 100; |
| butyl methacrylate | 10; |
| product of interaction of allyl alcohol with toluene diisocyanate and benzoyl chloride | 30; |
| perfluoropentyl alcohol | 1; |
| benzoyl peroxide | 1; |
| dimethyl aniline | 1. |

For bonding rocks (marble, granite) in air and under water, use should preferably be made of an adhesive composition having the following content of constituents, in parts by weight:

| | |
|---|---|
| 60% solution of polyethylene-glycol maleate in styrene | 100; |
| product of interaction of allyl alcohol with toluene diisocyanate and benzoyl chloride | 30; |
| perfluoropentyl alcohol | 0.1; |
| methyl-ethyl ketone peroxide | 2; |
| cobalt naphthenate | 8. |

If necessary, an adhesive composition may be used also containing fillers in an amount of 100 to 150 parts by weight per 100 parts by weight of acrylate or unsaturated polyester solutions of the above concentrations.

In the adhesive composition based on 30–50% acrylate solutions, used as the filler should be cement or quartz in an amount of 150 parts by weight per 100 parts by weight of said acrylate solutions, or powdered marble in an amount of 100 parts by weight per 100 parts by weight of said acrylate solutions.

The introduction into the adhesive composition of the product of interaction of allyl alcohol with a derivative of diisocyanate and benzoyl chloride, as well as of a fluorinated alcohol, imparts the composition higher waterproofness and a better ability to bond materials in water or in a medium of liquid hydrocarbons, the adhesion strength in this case being sometimes higher than that in the case of bonding dry, thoroughly cleaned materials. This feature of the adhesive composition is especially advantageous for bonding outdoors in damp and cold weather, during the construction, repair and mounting of various underwater installations, during the repair of oil storage tanks, pipelines, etc. No external pressure is required in the process of bonding.

Polymerizing agents, i.e., polymerization initiators and catalysts, accelerate the setting of the adhesive composition. Therefore, when use is made of polymerization initiators, bonding may be performed at temperatures ranging from 0° to +60°C, and, when bonding is performed at subzero temperatures, polymerization catalysts should be used instead of initiators.

The proposed adhesive composition is prepared as follows.

When used as the polymerizable unsaturated compounds are unsaturated polyesters, the latter are most often taken in the form of solutions thereof in monomers including unsaturated carbon-to-carbon bonds.

Used as the compounds including unsaturated carbon-to-carbon bonds, in the preparation of the adhesive composition, may be acrylic and methacrylic acids, esters thereof, styrene, cyanuric and isocyanuric esters, allyl alcohol esters, and maleic esters.

The adhesive composition is prepared in situ by successively adding to the solutions of unsaturated polyesters the product of interaction of allyl alcohol with a diisocyanate derivative and benzoyl chloride, a fluorinated alcohol, polymerization initiators or catalysts, and, if necessary, fillers, all these ingredients being stirred as they are being added to the solutions.

When preparing an adhesive composition containing acrylates as the polymerizable unsaturated compounds, a solution of an acrylate, e.g., polybutyl methacrylate, is first prepared in a monomeric acrylate, e.g., methyl methacrylate, butyl methacrylate or a mixture thereof. The solution is prepared in a reactor provided with an agitator, at room temperature. The prepared solution may be kept under normal conditions for no more than 6 months. Then, successively, added to the solution with stirring, are, also in situ, the product of interaction of allyl alcohol with a derivative of diisocyanate and benzoyl chloride, a fluorinated alcohol, polymerization initiators or catalysts, and, if necessary, fillers. This done, the composition is ready for use.

The adhesive composition may be applied to one or both surfaces being bonded. When surfaces are bonded under water or in a medium of liquid hydrocarbons, the adhesive may be applied either to both surfaces directly in the medium of said liquids or to one of them in air, whereafter it is immersed in the liquid and bonded with the other surface. No external pressure should be applied during the process; it is sufficient to bring the surfaces being bonded in intimate contact.

Used as the polymerization initiators or catalysts may be any agents causing the setting of polymerizable unsaturated compounds such as peroxides and hydroperoxides, diazo compounds, tertiary amines, salts of transition metals, sulphacids.

The fillers may be various finely dispersed and fibred inorganic and organic materials such as cement, talc, asbestos, quartz powder, synthetic and natural fibres, glass.

The product of interaction of allyl alcohol with a derivative of diisocyanate and benzoyl chloride is obtained as follows.

A diisocyanate derivative and allyl alcohol are charged into a reactor provided with a jacket and an agitator, in an inert atmosphere. The mixture is stirred. The temperature of the reaction mixture is maintained equal to from 60° to 80°C. After allyl alcohol has been exhausted in the mixture, benzoyl chloride is added, and the reaction mixture is stirred additionally at 30° to 50°C for another 60 or 90 minutes. The molar ratio of the starting components during the synthesis is as follows:

| | |
|---|---|
| diisocyanate derivative | 0.9 to 1.1 |
| allyl alcohol | 0.9 to 1.1 |
| benzoyl chloride | from 0.005 to 0.015 |

When obtaining the product of interaction of allyl alcohol with a diisocyanate derivative and benzoyl chloride, used as said diisocyanate derivative may be toluene diisocyanate, 4,4'-diphenyl-methane diisocyanate, or hexamethylene diisocyanate.

For a better understanding of the invention, given below are the following examples illustrating how the invention can be reduced to practice.

EXAMPLE 1

An adhesive composition with the following content of constituents, in parts by weight, had been prepared:

| | |
|---|---|
| 40% solution of polybutyl methacrylate in methyl methacrylate | 100; |
| product of interaction of allyl alcohol with toluene diisocyanate and benzoyl chloride | 10; |
| perfluorohexyl alcohol | 1; |
| benzoyl peroxide | 1; |
| dimethyl aniline | 1. |

This adhesive composition was used to bond various materials under water. The bonding peel strength of the bonded specimens was equal to:

315 kg/cm² for steel (high enough to cause rupture of steel);
220 kg/cm² for aluminium-magnesium alloy;
140 kg/cm² for epoxy-resin glass laminate;
50 to 60 kg/cm² for silicate glass;
50 to 70 kg/cm² for wood.

The adhesion strength for steel bonded in an oil medium was equal to 200 kg/cm².

Gradual decrease in the strength of adhesive bonds working under water was below 10 percent.

It took some 40 min for said adhesive composition to set at 20°C.

EXAMPLE 2

An adhesive composition with the following content of constituents, in parts by weight, had been prepared:

| | |
|---|---|
| 60% solution of polyethylene-glycol maleate in styrene | 100; |
| product of interaction of allyl alcohol with toluene diisocyanate and benzoyl chloride | 50; |
| perfluorododecyl alcohol | 0.1; |
| methyl-ethyl ketone peroxide | 2; |
| cobalt naphthenate | 8; |
| cement | 150. |

The bonding peel strength for steel bonded under water was equal to 180 kg/cm².

The bonding peel strength for oil-coated steel specimens bonded under water was 190 kg/cm².

The bonding peel strength for marble specimens bonded under water was so high that attempts to separate them caused rupture of marble itself.

Gradual decrease in the bonding strength of bonded steel specimens was below 10 percent after they had been held in water or in oil for a year and after they had been subjected to 50 cycles of freezing or 50 cycles of wetting.

The setting time of said adhesive composition at 20°C was equal to 40 min.

When used as the polymerization initiator were 0.8 parts by weight of benzoyl peroxide and 0.5 parts by weight of dimethyl aniline, it took 10 minutes for the composition to set.

EXAMPLE 3

An adhesive composition having the following content of constituents, in parts by weight, had been prepared:

| | |
|---|---|
| 40% solution of polybutyl methacrylate in methyl methacrylate | 100; |
| butyl methacrylate | 10; |
| product of interaction of allyl alcohol with toluene diisocyanate and benzoyl chloride | 30; |
| perfluoropentyl alcohol | 1; |
| benzoyl peroxide | 1; |
| dimethyl aniline | 1. |

The bonding peel strength for steel specimens bonded under water was equal to 320 kg/cm², the bonding shear strength thereof was equal to 250 kg/cm², and the bonding peel strength for steel specimens bonded in oil was equal to 210 kg/cm².

Said adhesive composition was used to repair an underwater pipeline which had a hole 5 cm² in diameter. A sheet steel patch 150 cm² in size was applied to the affected portion of the pipeline wall with the adhesive composition already spread on the patch. No additional steps were required to fix the patch. The wall of the pipeline around the hole was not cleaned prior applying the patch.

Experiments have shown that the repaired section of the pipeline could endure a pressure of up to 100 atm.

The vibration resistance coefficient of adhesive bonds for steel wherein use is made of this adhesive composition was found to be equal to 0.35, as a result of $10^6$ vibration cycles.

EXAMPLE 4

An adhesive composition with the following content of constituents, in parts by weight, had been prepared:

| | |
|---|---|
| 50% solution of polyethylene-glycol maleate in methyl methacrylate | 100; |
| product of interaction of allyl alcohol with toluene diisocyanate and benzoyl chloride | 30; |
| perfluoropentyl alcohol | 0.2; |
| methyl-ethyl ketone peroxide | 2; |
| cobalt naphthenate | 8; |
| dimethyl aniline | 0.2. |

The bonding peel strength for steel specimens bonded under water equalled 240 kg/cm².

EXAMPLE 5

An adhesive composition with the following content of constituents, in parts by weight, had been prepared:

| | |
|---|---|
| 30% solution of polybutyl methacrylate in methyl methacrylate | 100; |
| product of interaction of allyl alcohol with toluene diisocyanate and benzoyl chloride | 10; |
| perfluoropentyl alcohol | 1; |
| benzoyl peroxide | 1; |
| dimethyl aniline | 1. |

This adhesive composition was used for adhesion-welding bonding. Experiments have shown that the composition may be used for saturating prewelded joints; moreover, the composition may be applied to the surfaces to be welded. The adhesive made welds stronger by 40 percent.

EXAMPLE 6

An adhesive composition having the following content of constituents, in parts by weight, had been prepared:

| | |
|---|---|
| 60% solution of polyethylene-glycol maleate in styrene | 100; |
| product of interaction of allyl alcohol with toluene diisocyanate and benzoyl chloride | 30; |
| perfluoropentyl alcohol | 0.1; |
| methyl-ethyl ketone peroxide | 2; |
| cobalt naphthenate | 8. |

This adhesive composition was used to repair a cracked oil storage tank having a volume of 12,000 m³. The affected portions of the tank wall were not degreased prior to applying the adhesive.

The adhesive was applied to cracks with brushes. The ambient temperature during the repair was 10° to 15°C. The adhesive was applied both to dry and wet (during rain) surface.

The repaired tank was tested and found leakproof.

EXAMPLE 7

An adhesive composition with the following content of constituents, in parts by weight, had been prepared:

| | |
|---|---|
| 50% solution of polyisobutyl methacrylate in methyl methacrylate | 100%; |
| product of interaction of allyl alcohol with 4,4'-diphenyl-methane diisocyanate and benzoyl chloride | 10; |
| perfluoropentyl alcohol | 6; |
| benzoyl peroxide | 1; |
| dimethyl aniline | 2. |

Said adhesive composition was used to bond polyamide fibres to the fuselage of a jet aircraft prior to an airflow-around-aircraft test. Bonding was carried out at 0°C in the sleet. Tests have shown that in flight no peeling of the fibres occurred. This composition was also used to secure resistance strain gauges and vibration pick-ups to the fuselage of an aircraft. During test flights, the gauges functioned normally.

EXAMPLE 8

An adhesive composition with the following content of constituents, in parts by weight, had been prepared:

| | |
|---|---|
| 60% solution of polyethylene-glycol maleate in styrene | 100; |
| product of interaction of allyl alcohol with toluene diisocyanate and benzoyl chloride | 10; |
| perfluoropentyl alcohol | 0.2; |
| benzoyl peroxide | 0.6; |
| dimethyl aniline | 0.5; |
| quartz powder | 150. |

This adhesive composition was used to bond unused mills, employed in natural stone polishing machines, to worn out mills. The latter were covered with a pulp consisting of fine stone particles suspended in water.

Bonding was performed at 20°C, and it took 10 min for the composition to set.

When the bonds were tested for peel and impact, it was found that the mills could not be separated because the mills themselves were broken.

EXAMPLE 9

An adhesive composition with the following content of constituents, in parts by weight, had been prepared:

| | |
|---|---|
| 40% solution of polybutyl methacrylate in methyl methacrylate | 100; |
| product of interaction of allyl alcohol with toluene diisocyanate and benzoyl chloride | 10; |
| perfluoropentyl alcohol | 1; |
| benzoyl peroxide | 1; |
| dimethyl aniline | 1. |

This adhesive composition was used to repair a vessel made of glass laminate below the waterline. The vessel was repaired as follows.

A six-layer stack of glass laminate was prepared in air. Each layer of the glass laminate in the stack was impregnated with the adhesive composition. Then, the stack was given to a diver who attached it to the affected area.

After that, another stack of glass laminate was prepared in a similar manner, impregnated with the composition, and attached to the affected area from the inside. After the adhesive composition in the latter stack had set, the one attached by the diver on the outside of the vessel was removed. Tests in stormy weather over a period of 12 months have shown that the repaired portion of the hull had behaved well.

EXAMPLE 10

An adhesive composition with the following content of constituents, in parts by weight, had been prepared:

| | |
|---|---|
| 60% solution of polyethylene-glycol maleate in styrene | 100; |
| product of interaction of allyl alcohol with toluene diisocyanate and benzoyl chloride | 20; |
| perfluoropentyl alcohol | 0.6; |
| methyl-ethyl ketone peroxide | 2; |
| cobalt naphthenate | 8; |
| powdered marble | 100. |

This composition was used to make a mosaic from pieces of marble having a thickness of 1.5 cm and a surface area of about 100 cm$^2$, which pieces were bonded together along their lateral surfaces.

When the mosaic was tested, it was found, after 100 cycles of wetting and 100 cycles of freezing and thawing ($-20°$ to $+20°C$), that the bonding strength remained practically unaffected, and the attempts to separate the marble pieces resulted in their rupture.

What is claimed is:

1. An adhesive composition comprising 100 to 110 parts by weight of a 30 to 50% solution of a polyacrylate in an acrylate solvent, 10 to 60 parts by weight of the product of interaction of allyl alcohol with an aromatic diisocyanate and benzoyl chloride, said interaction product being formed by a starting composition containing in molar ratio from 0.9 to 1.1 of said allyl alcohol, from 0.9 to 1.1 of said aromatic diisocyanate, and from 0.005 to 0.015 of said benzoyl chloride, 0.1 to 10 parts by weight of a fluorinated alcohol of the general formula $C_nF_{2n+1}OH$ in which $n$ is 5 to 15, and 0.1 to 3 parts by weight of a polymerization agent selected from the group consisting of a polymerization initiater and a polymerization catalyst.

2. The adhesive composition of claim 1 in which said composition contains 10 to 30 parts by weight of said interaction product, 1 to 6 parts by weight of said fluorinated alcohol and 1 to 3 parts by weight of said polymerization agent.

3. The adhesive composition of claim 2 in which said acrylate solvent is methyl methacrylate, butyl methacrylate or mixtures thereof.

4. The adhesive composition of claim 2 in which said aromatic diisocyanate is toluene diisocyanate, 4,4'-diphenylmethane diisocyanate or hexamethylene diisocyanate.

5. The adhesive composition of claim 2 and further comprising a filler selected from the group consisting of cement, talc, asbestes, quartz, synthetic fibers, natural fibers and glass.

6. The adhesive composition of claim 2 and further comprising 100 to 150 parts by weight of a filler per 100 parts by weight of said solution.

7. The adhesive composition of claim 2 and further comprising 150 parts by weight of cement or quartz per 100 parts of said solution.

8. The adhesive composition of claim 2 and further comprising 100 parts by weight powdered marble per 100 parts by weight of said solution.

9. The adhesive composition of claim 2 in which said polymerization agent is a peroxide, hydroperoxide, diazo compound, tertiary amine, transition metal salt or sulphacid.

10. The adhesive composition of claim 2 in which said polyacrylate is polybutyl methacrylate and said acrylate solvent is methyl methacrylate.

* * * * *